United States Patent [19]
Van Dest

[11] 3,799,003
[45] Mar. 26, 1974

[54] MULTI-RATIO TRANSMISSION AND CONTROLS THEREFOR

[75] Inventor: Jean Claude Van Dest, Westland, Mich.

[73] Assignee: Massey-Ferguson Inc., Detroit, Mich.

[22] Filed: Apr. 19, 1973

[21] Appl. No.: 352,848

Related U.S. Application Data

[63] Continuation of Ser. No. 147,572, May 27, 1971, abandoned.

[52] U.S. Cl. .................................. 74/740, 74/767
[51] Int. Cl. ..................... F16h 57/10, F16h 5/36
[58] Field of Search ...................... 74/766, 767, 740

[56] References Cited
UNITED STATES PATENTS

| | | | |
|---|---|---|---|
| 2,761,333 | 9/1956 | Ravigneaux | 74/759 |
| 2,839,951 | 6/1958 | Winther | 74/740 X |
| 2,847,877 | 8/1958 | Ravigneaux | 74/759 |
| 2,985,036 | 5/1961 | Forster | 74/740 |
| 3,313,182 | 4/1967 | Nollinger | 74/740 |
| 3,721,135 | 3/1973 | Kelley | 74/766 X |

Primary Examiner—Arthur T. McKeon
Attorney, Agent, or Firm—George C. Bower

[57] ABSTRACT

A speed change transmission system for tractors and the like has an eight speed selective gear transmission preceded by a single planetary gear set. A selective coupling between the two enables the planetary gear to function either as a three forward speed range selector or as a forward-neutral-reverse shuttle transmission, depending upon which output member of the planetary is coupled to the input of the selective gear transmission. The drive paths through the planetary are selected by plate type friction elements which are controlled by a single member acting to operate valves that control the flow of the hydraulic pressure to the friction elements.

22 Claims, 4 Drawing Figures

PATENTED MAR 26 1974

INVENTOR.
JEAN CLAUDE VAN DEST
BY
Gerhardt, Greenlee & Farris
ATTORNEYS.

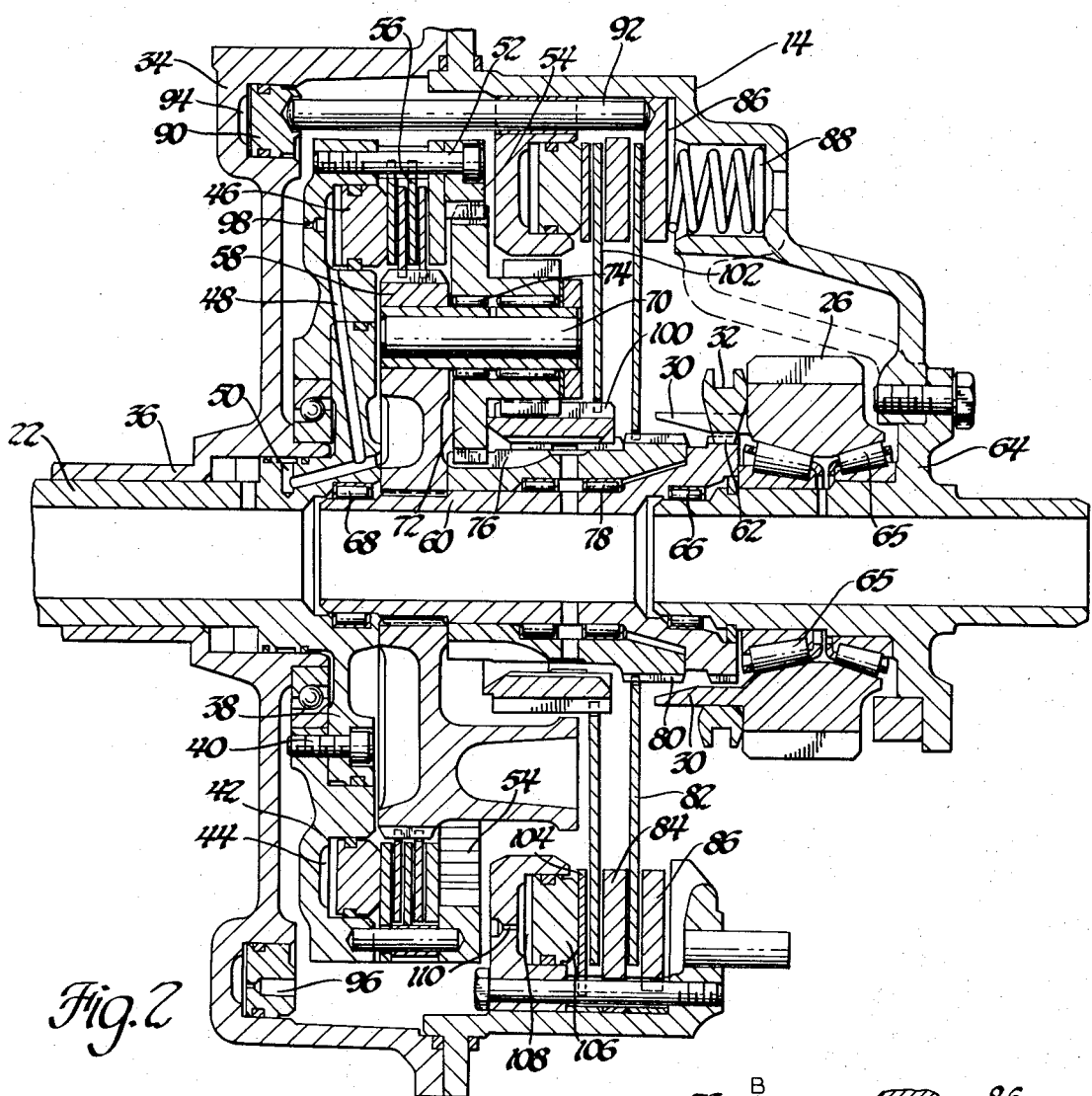
Fig. 2
Fig. 3
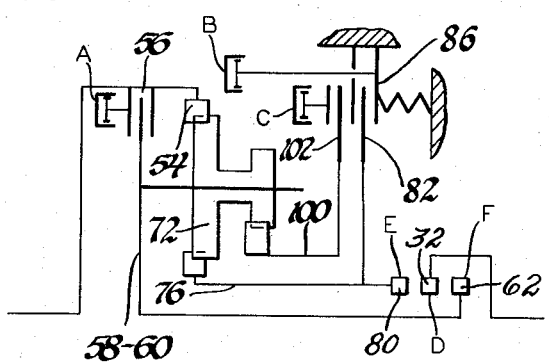
Fig. 4
INVENTOR.
JEAN CLAUDE VAN DEST

MULTI-RATIO TRANSMISSION AND CONTROLS THEREFOR

This is a continuation of my application, Ser. No. 147,572, now abandoned filed on May 27, 1971 and entitled "Multi-Ratio Transmission and Controls Therefor."

The invention relates to multiple speed transmissions and controls and more specifically to transmission and controls suitable for use in both agricultural and industrial type tractors.

It has long been recognized that the versatile farm tractor which can perform so many tillage and harvesting operations on the farm and which is manufactured by mass production methods, can be readily adapted to use in the bulk material handling and excavating operations required in the highway and other construction industries. The modifications on a farm tractor which are necessary for successful use in the construction industry have become so numerous and varied that most farm tractor manufacturers now produce two different lines of tractors for the two fields of use, with fewer and fewer common components between the two lines.

One important difference lies in the transmission which, for farming operations, requires that a large number of closely spaced gear ratios be available for efficiently matching the tractor's drawbar power and speed to the many varieties of tillage and harvesting operations encountered. On the other hand, for industrial and construction use, only a few speed ratios are required, but it is necessary, particularly in handling bulk materials, when using a front-end loader bucket that the transmission can be quickly and easily shifted between forward and reverse with a rapid braking of the vehicle in between. From these two different requirements, there has evolved a practice of placing in series with a selective gear transmission, which may be common to both lines of tractors, a supplementary transmission which in the case of farm tractors, provides two or more speed ranges and in the case of the industrial tractors, provides convenient reversibility. Thus, it has been necessary to produce two entirely different supplementary transmission—the range transmission for farm work and the shuttle transmission for industrial work.

The present invention aims to provide a supplementary transmission which, within itself, provides both the speed range and the shuttle functions and which furthermore provides such a transmission which may be operator controlled to provide either of these functions at will and which can be easily controlled to provide shifts under power without declutching the engine.

The invention still further includes the provision of a speed change transmission system for a tractor or the like comprising a multispeed gear transmission and a second planetary gear transmission in series with the first transmission comprising a single planetary having a planet carrier provided with planet pinions of the two-diameter cluster type, a ring gear and a pair of sun gears each engaging one of the pinions of the planet cluster. Selectively engageable brakes act to lock either of said sun gears for planetary drive and a selectively engageable clutch acts to lock up the planetary. Means are provided for selectively engaging one of the sun gears with an output shaft to provide forward drive and reverse drive through the planetary by selective operation of the brakes and clutch or alternatively for engaging the output shaft with the planet carrier to provide low, intermediate or high speed forward drive through the planetary by selective operation of the brakes and clutch.

The invention further features a simple control for the planetary transmission to obtain the three forward speed conditions from one output or forward, brake and reverse conditions from the other output by providing these hydraulic cylinders for controlling the brakes and clutch and three valves each controlling one of the cylinders whereby a single manually set member which controls the sequential operation of the valves will cause selection of the various conditions of the planetary transmission.

A further feature of the invention lies in the provision of a spring application and hydraulic pressure release of a first friction member that establishes either intermediate forward speed or braking condition. A second friction member that establishes either low speed or forward and a third friction member that establishes either high speed or reverse are each hydraulically applied. The three valves controlling the friction members are arranged so that the same hydraulic pressure that applies to either the second or third friction member acts to release the first friction member.

These and further objects and features of this invention will become more readily apparent upon reference to the following detailed description of the attached drawings, wherein:

FIG. 2 is a sectional view on a larger scale of the range-shuttle gear set;

FIG. 3 is a diagram of the planetary gear set; and

FIG. 4 is a table illustrating the modes of control of the planetary gear set.

Figure 1:
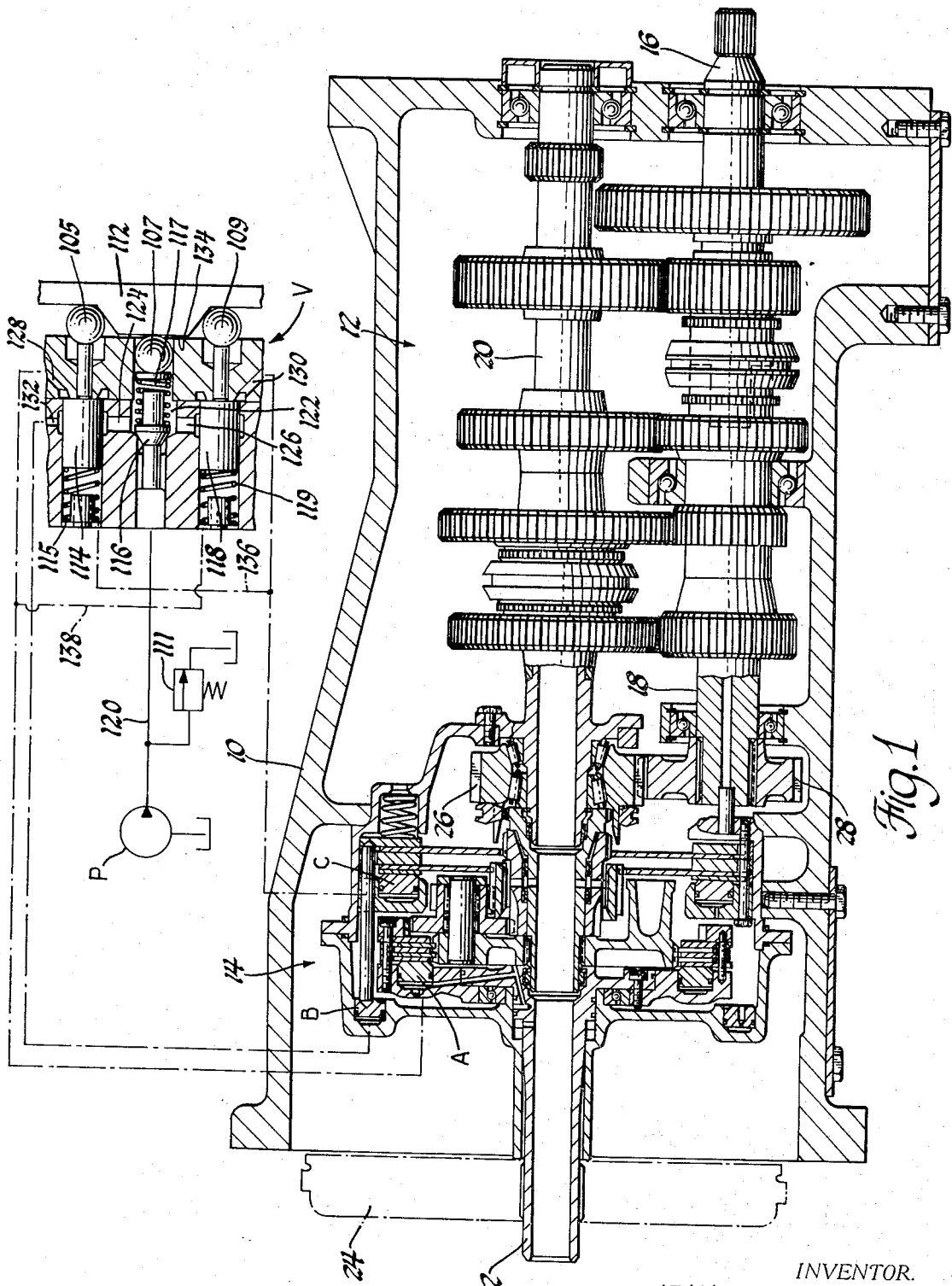
FIG. 1 is a longitudinal sectional view of a tractor transmission incorporating a preferred form of the present invention.

Referring now to FIG. 1, there is illustrated a transmission housing 10 containing a selective gear transmission generally indicated 12 and a planetary gear set generally indicated 14. The selective gear set 12 may be of any conventional form except that no reverse gear is needed, the form shown being a partially synchronized eight speed arrangement. Shaft 16 is the output shaft and shaft 18 is the input shaft for the selective gear transmission, the countershaft 20 of which is coaxial with the input shaft 22 coupled to the engine flywheel 24 and main clutch of the tractor. A live PTO shaft, not shown, may extend from the main clutch through the input shaft 22 and following coaxial shafts.

Drive is established between the planetary unit 14 and the transmission 12 by means of pinions 26 and 28. Pinion 26 carries integrally a series of prongs 30 on its left-hand side (see FIG. 2). A shift collar 32 is slidable, but not rotatable, relative to the prongs 30 and carries on its inner circumference a female spline. This spline is selectively engageable with either of two output members of the planetary 14. This forms a connecting means between the output gear and the planetary.

The planetary gear set is contained within an enclosing case 34 which, at its left-hand side, has a tubular extension 36 enclosing the input shaft 22. The latter has a flange 38 on its right-hand end to which is bolted at 40, an annular disc 42. An annular cylinder 44 formed in member 42 contains an annular piston 46 and communicates by passages 48 with the hydraulic slip-ring 50 which leads to stationary control conduits, not illustrated. Bolted at 52 to the disc 42 is a ring or orbit gear 54 and a multi-plate lock-up clutch 56. The driven plates of the clutch 56 are splined to a planet carrier 58. Carrier 58 is drivingly connected to an output sleeve 60 having a splined drive connection 62 engageable with the splines of the collar 32. A stationary flanged sleeve 64 supports on bearings 65 the output pinion 26 and, on bearings 66, the right end of the output sleeve 60, the left end of which is journalled on bearings 68 within the flanged end 38 of the input shaft 22.

A shaft 70 mounted in the carrier 58 carries a duplex cluster pinion 72 on bearing 74. Similar cluster pinions may be mounted at spaced intervals around the carrier 58. Pinion 72 has its large diameter teeth intermeshing with both the orbit gear 54 and with a small diameter sun pinion 76 mounted on bearings 78. Sun pinion 76 has an output spline 80 which also may be engaged by the shift collar 32. Splines 80 also carry a brake disc 82 which may be clamped between a stationary back plate 84 and a clamping plate 86. The plate 86 is biased toward clamping position by a spring 88 with similar springs distributed circumferentially within the casing 34. The brake disc 82 or first brake is normally locked to the casing 34 but may be released by an annular piston 90 acting through a series of operating rods 92. Piston 90 is contained within an annular cylinder 94 and may have a restricted bleed hole as indicated at 96. A similar bleed 98 may be provided for the cylinder 44.

The small diameter teeth of planet pinion 72 mesh with a large diameter sun pinion 100 which is rotatably mounted on the shank of the small sun pinion 76. The large sun pinion 100 has splined to it a brake disc of second brake 102 which may be clamped against the back plate 84 by a nonrotatable clamping plate 104. An annular piston 196 operates in an annular cylinder 108 to control the clamping plate 104. Cylinder 108 has a bleed 110.

In FIG. 3 there is diagrammed the basic elements of the planetary gear set in which A, B and C represent the cylinders 44, 94 and 108 respectively. D represents the shift collar 32, E represents the splines 80, and F the splines 62.

The cylinders A, B and C are controlled by a relatively simple three-element poppet valve unit generally indicated V. A source of fluid under pressure P has its output controlled by a pressure regulator valve 111. Three poppet valves 114, 116 and 118 are arranged to be operated by an operator controlled cam member 112 acting through balls 105, 107 and 109 respectively. Valves 114 and 118 are urged to the right by springs 115 and 119 to their closed positions shown in FIG. 1. The center valve 116 is urged by spring 117 to the left and is guided in the valve housing. When in the position shown in FIG. 1 the valve 116 acts to close passage 120 leading from the pump P to the chamber 122. This chamber has radial passages 124 and 126 leading to valves 114 and 118, respectively. An output passage 128 from valve 114 connects to the hydraulic cylinder A and a similar output passage 130 from valve 118 connects to the cylinder C. Cylinder B is connected by way of passage 132 to passage 124 and thus is connected to chamber 122 whenever valve 116 is open.

The cam 112, which may be either rotated or reciprocated, has a raised cam portion 134 having upper and lower slope or ramp control portions. By operation of cam 112 either by rotation or reciprocation, the balls 105, 107 and 109 will be selectively moved to control the three valves. In the position shown, no pressure is admitted to any of the cylinders A, B or C so that only brake 82 is applied. Initial movement of cam 112 upward from the position shown will cause the ball 105 to ride up the upper cam slope (to the left in FIG. 1) and through its associated plunger move valve 114 to the left against spring 115 to connect passage 124 with passage 128. At this time, the center valve 116 is still held closed by ball 107 acting through spring 117. Further movement upward of cam member 112 will allow ball 107 to begin to ride down the lower slope or ramp on portion 134 permitting the oil under pressure from line 120 acting on valve 116 to gradually open the same allowing oil under pressure into chamber 122, passages 124, 132 and 128 to operate cylinders A and B, with only clutch 56 applied.

Movement of the cam 112 downward from the position shown will cause the ball 109 to ride up the lower slope on portion 134 to move valve 118 against spring 119 to connect passage 126 with passage 130. Further downward movement will allow ball 107 to ride down the upper slope of the portion 134 permitting valve 116 to open allowing oil under pressure into chamber 122 at passages 124, 132, 126 and 130. Under this condition cylinders B and C will be operated, with only brake 102 applied.

Movement of the ball 107 on the upper and lower slopes of cam portion 134 will variably control the compresssion of spring 117 and thus control the pressure of oil in chamber 122 and whatever cylinders are connected thereto. The rate of application and disengagement of the respective clutch 56 and brakes 82 or 102 may thus be controlled by movement of the cam 112. The left side of valve 114 is connected by a passage 136 to passage 130 and the left side of valve 118 is connected by a passage 138 to the passage 128. Thus whenever cylinder A is pressurized this pressure acts on valve 118 to prevent the ball 109 from moving up the lower slope on portion 134. This will prevent the operator from shifting from a condition where cylinder A is actuated to a condition where cylinder C is actuated until the pressure on the originally activated cylinder is reduced. Likewise, whenever cylinder C is actuated the pressure thereon will act to hold valve 114 closed preventing cylinder A from being actuated until the pressure in cylinder C is dissipated.

The right hand end of valve 114 is exposed to pressure in cylinder A and the right hand end of valve 118 to the pressure in cylinder C. When a shift is made either from the cam up position or cam down position the respective valve will be held open by pressure created by spring 88 acting through rod 92 on piston 94 to create an accumulative effect to maintain pressure while oil is draining through relief port 96 and 98 or 110 as the case may be. This will allow a gradual application of brake 82 and gradual release of clutch 56 or brake 102. When the pressure acting to hold valve 114 or valve 118 open drops sufficiently to allow the respective valve spring to close the valves they assume the position shown in FIG. 1.

The planetary gear set is operable in any one of seven modes as tabulated in FIG. 4. When it is desired to have a multiplicity of forward speed ratios available in the transmission as a whole, shift collar 32 is positioned as shown in FIG. 2 to couple the output pinion 26 with the planet carrier 58–60. That is, the D–F coupling is established. Under these conditions, for the high speed cam 112 is moved up so that lock-up clutch 56 is engaged by actuator A and direct drive through the planetary at 1–1 ratio is established. Both brakes 82 and 102 are released for this purpose. To obtain medium range, cam 112 is in its mid position. In this position brake 102 is released and brake 82 is engaged, clutch 56 is disengaged. Under these conditions, the carrier 58–60 is driven from the orbit gear 54 at an intermediate rate of speed. For low speed reduction, cam 112 is moved down. Clutch 56 remains released, brake 82 is released and brake 102 is applied to lock the large sun pinion 100. Thus, the carrier 58–60 will be driven at a speed somewhat slower than the speed of the orbit gear 54.

When shift collar 32 is moved to the left to engage spline 80 on the small sun gear to establish coupling D–E, the output of the planetary set is from the sun gear 76. Selection is then available between forward, brake and reverse. Thus, for forward drive, the cam 112 is moved up so that the lock-up clutch 56 is engaged and the brakes 82 and 102 are released. The output pinion 26 is then direct one to one. For a reverse drive, cam 112 is moved down. The clutch 56 is released, brake 102 is engaged and brake 82 is released. Under these conditions, the orbit gear 56 walks the planets and their carrier 58–60 around the large sun gear 100 and the small sun gear 76 is driven reversely. The output is driven in reverse. In between forward and reverse there is a braking effect on the output shaft when cam 112 is in its mid position so that brake 82 alone is applied, which through coupling D–E acts to brake the output shaft 18.

FIG. 4 illustrates the condition of the cylinders A, B and C as well as the position of cam 112 which will produce the three forward speeds in the D–F couple condition and forward, brake and reverse in the D–E shuttle couple condition. A plus sign indicates that a particular cylinder is pressurized and a minus sign that the cylinder is not pressurized.

It will be clear that the complete transmission shown has eight twenty-four speeds forward when in the D–F forward couple range and eight speeds forward, eight speeds reverse and brake in the D–E shuttle range. When in the D–F forward range the operator can easily power shift without declutching up or down from any speed ratio set in the eight speed unit 12 by moving the cam member 112 up or down. When the D–F shuttle range the operator can power shift without declutching from forward to reverse with an intermediate braking or retard condition.

If the intermediate brake condition was not needed and a neutral condition needed, the valve controls for the cylinders A, B and C could be arranged to have a condition where only cylinder B was energized in which case clutch 56, brake 82 and brake 102 would all be deactivated providing a neutral in the planetary unit. When the planetary unit is utilized with another sliding gear type transmission unit itself having a neutral, then there is no necessity for a neutral in the planetary unit.

I claim:

1. A speed change transmission system having a multi-speed gear transmission, a planetary gear transmission in series with the multi-speed gear transmission, said planetary gear transmission comprising a planetary having a planet carrier provided with planet pinions of the two-diameter cluster type, ring gear means and sun gear means, one of said gear means including a pair of gears each being engaged with one of the pinions of the planet cluster, a first brake for locking one gear of said pair of gears and a second brake for locking the other gear of said pair of gears, a selectively engageable clutch for locking up the planetary, an input member connected to the other gear means, an output member, and connecting means for selectively engaging said output member with the one of said pair of gears to provide a forward drive and a reverse drive through the planetary by the respective application of the clutch and the second brake or for engaging said output member with the carrier to provide three speed forward drives through the planetary by the respective application of the clutch, the first brake and the second brake.

2. A transmission system as defined in claim 1 wherein the pair of gears are a pair of sun pinions and the other gear means is a ring gear.

3. A transmission system as defined in claim 2 wherein the input member is connected to the ring gear and the output member may be selectively connected either with one of the sun pinions or with the carrier.

4. A transmission system as defined in claim 2 wherein the diameter ratios of the cluster pinions and of the sun pinions are chosen to provide nearly the same speed ratio in forward and reverse directions when the connecting means is engaged with one of the sun pinions.

5. A transmission system as defined in claim 2 wherein the brakes are connected to lock either of the sun pinions.

6. A transmission system as defined in claim 1 wherein the diameter ratios of the cluster pinions are chosen to provide nearly the same speed ratio in forward and reverse directions of drive when said output member is engaged with one of said pair of gears.

7. A transmission system as defined in claim 1 wherein the lock-up clutch is connected between the carrier and the ring gear means.

8. A transmission system as defined in claim 1 which includes resilient means for engaging and hydraulic means for releasing the first brake and hydraulic means for actuating the second brake into engagement.

9. The transmission system as defined in claim 8 wherein the brakes are disc brakes and a non-rotary disc provides a common reaction member for both brakes.

10. The transmission system as defined in claim 8 including hydraulic means for applying said clutch.

11. The transmission system as defined in claim 1 wherein said output member is braked by engagement by said first brake when said output member is connected with said one gear of said pair of gears.

12. The transmission system as defined in claim 11 wherein an operator controlled valve means selectively directs hydraulic pressure to engage said second brake and disengages said first brake to establish either a low forward speed drive or reverse drive depending on the position of the connecting means, prevents hydraulic pressure from disengaging said first brake to establish either an intermediate forward drive or braking condition of said output member depending on the position of said connecting means, and directing hydraulic pressure to engage said clutch and release said first brake to establish high speed drive or forward drive depending on the position of said connecting means.

13. A speed change transmission system having a planetary gear transmission and a multi-speed gear transmission connected in series, said planetary gear transmission comprising a single planetary having a planet carrier provided with planet pinions of the two-diameter cluster type, ring gear means and sun gear means, one of said gear means including a pair of gears each being engaged with one of the pinions of the planet cluster, characterized by an input member connected to the other gear means, an output member, a first brake for locking one gear of said pair of gears and a second brake for locking the other gear of said pair of gears, a clutch connected between the input member and the planet carrier for locking up the planetary, and connecting means coupled to said output member and having two conditions, in one condition the output member is connected with the one of said pair of gears to provide the planetary gear transmission with a forward drive and a reverse drive through the planetary by the respective application of the clutch and the second brake, said output member is connected with the planet carrier to provide the planetary gear transmission with three forward drives through the planetary by the respective application of the clutch, the first brake and the second brake.

14. A speed change transmission system having a multi-speed gear transmission, a planetary gear transmission in series with the multi-speed gear transmission, said planetary gear transmission comprising a planetary having a planet carrier provided with two planet pinions of different diameters, ring gear means and sun gear means, one of said gear means including a pair of gears each being engaged with one of the pinions of the planet pinions, and input member connected to the other gear means, an output member, a first brake for locking one gear of said pair of gears and a second brake for locking the other gear of said pair of gears, a selectively engageable clutch connected between the input member and the planet carrier for locking up the planetary, and connecting means for selectively engaging said output member with the one of said pair of gears to provide a forward drive and a reverse drive through the planetary by the respective application of the clutch and the second brake or for engaging said output member with the carrier to provide three speed forward drives through the planetary by the respective application of the clutch, the first brake and the second brake.

15. A control for a change speed transmission having a plurality of friction members that act to establish and disestablish various drives through the transmission, first and second hydraulic actuating means for engaging first and second of said friction member to respectively establish two different drives and resilient actuating means for actuating a third friction member to establish a third drive, and a third hydraluic actuating means for overcoming said resilient actuating means to disengage said third friction member when said transmission is in said first or second drives, a hydraulic pressure source, valve means for selectively connecting said source to said first, second or third hydraulic actuating means to establish said first, second or third drives, said valve means including first, second and third valves, said first valve operable to connect said source to said third hydraulic actuating means and simultaneously to either connect said source to said second valve leading to said first actuating means or to said third valve leading to said second actuating means, operator means for said valve means having a first position wherein all three valves are closed, a second position wherein said first and second valves are open and a third position where said first and third valves are open, and means for permitting pressure in said actuators to be relieved.

16. The control of claim 15 wherein said means for permitting pressure in said actuators to be relieved comprises restricted flow relief means in each actuator.

17. The control of claim 15 wherein said operator in moving from said first position to said second position initially opens said second valve and subsequently opens said first valve, and in moving from said first position to said third position initially opens said third valve and subsequently opens said first valve.

18. The control of claim 17 wherein said first valve is urged to its normally closed position by a spring means, the force of which can be varied by said operator and wherein said first valve is urged toward its open position by hydraulic pressure from said source whereby said operator can regulate the flow from said source to said hydraulic operating means.

19. The control of claim 17 wherein pressure in said first actuator acts on said second valve to hold it open and pressure in said second actuator acts on said third valve to hold it open.

20. The control of claim 17 wherein pressure in said first actuator acts on said third valve to hold it closed and pressure in said second actuator acts on said second valve to hold it closed.

21. The control of claim 15 wherein said operator consists of a cam member having a first position in which a cam portion acts on said first valve to hold it closed, and a second position in which the cam portion allows the first valve to open while acting on said second valve to open it, and a third position in which the cam portion allows the first valve to open while acting on said third valve to open it, 22. A control for a change speed transmission having at least two friction members the actuation of which establish two different drives through the transmission; one of said friction members being normally resiliently applied and hydraulically released and the other normally released and hydraulically applied, a source of hydraulic pressure; a valve means with one valve, another valve and a valve operator; said one valve connected to said source and held in a closed position by a valve operator member in a first position acting on said one valve through an intermediate spring to hold it closed against said hydraulic pressure, said hydraulic pressure acting on said one valve to move it to an open position when said valve operator is moved from its first position to a second position; said one valve acting when open to connect said hydraulic pressure to said hydraulically released friction member and to said other valve; said other valve being closed when the operator is in the first position and being opened when said valve operator is in its second position; said other valve, when open, acting to direct hydraulic pressure from said one valve to said hydraulically applied friction member; said valve operator when moving from its first position to its second position initially acting to open said other valve and subsequently to allow gradual opening of said one valve.

* * * * *